United States Patent

[11] 3,581,227

| [72] | Inventor | Theodore J. Podgorski |
| | | Maplewood, Minn. |
| [21] | Appl. No. | 722,227 |
| [22] | Filed | Apr. 18, 1968 |
| [45] | Patented | May 25, 1971 |
| [73] | Assignee | Honeywell Inc. |
| | | Minneapolis, Minn. |

[54] ADJUSTABLE, THIN MEMBRANE MIRROR FOR USE IN THE STABILIZATION OF RING LASERS
1 Claim, 1 Drawing Fig.

[52] U.S. Cl. .................................................. 331/94.5,
350/161, 350/269, 356/106
[51] Int. Cl. ....................................................... H01s 3/08
[50] Field of Search ........................................... 331/94.5;
356/106 RL; 350/161, 266, 269, 288

[56] References Cited
UNITED STATES PATENTS

| 3,277,396 | 10/1966 | Statz et al. .................. | 331/94.5 |
| 3,449,692 | 6/1969 | Haake ......................... | 331/94.5 |
| 3,469,922 | 9/1969 | Coccoli et al. ............... | 331/94.5 |
| 3,473,143 | 10/1969 | Simmons et al .............. | 331/94.5 |

*Primary Examiner*—William L. Sikes
*Attorneys*—Charles J. Ungemach, Ronald T. Reiling and George W. Field

ABSTRACT: Apparatus to remotely move a mirror in a laser. The driving means operates against a thin membrane forming a portion of the laser housing so that a mirror fastened to the inside of the membrane may be moved as desired.

PATENTED MAY 25 1971    3,581,227
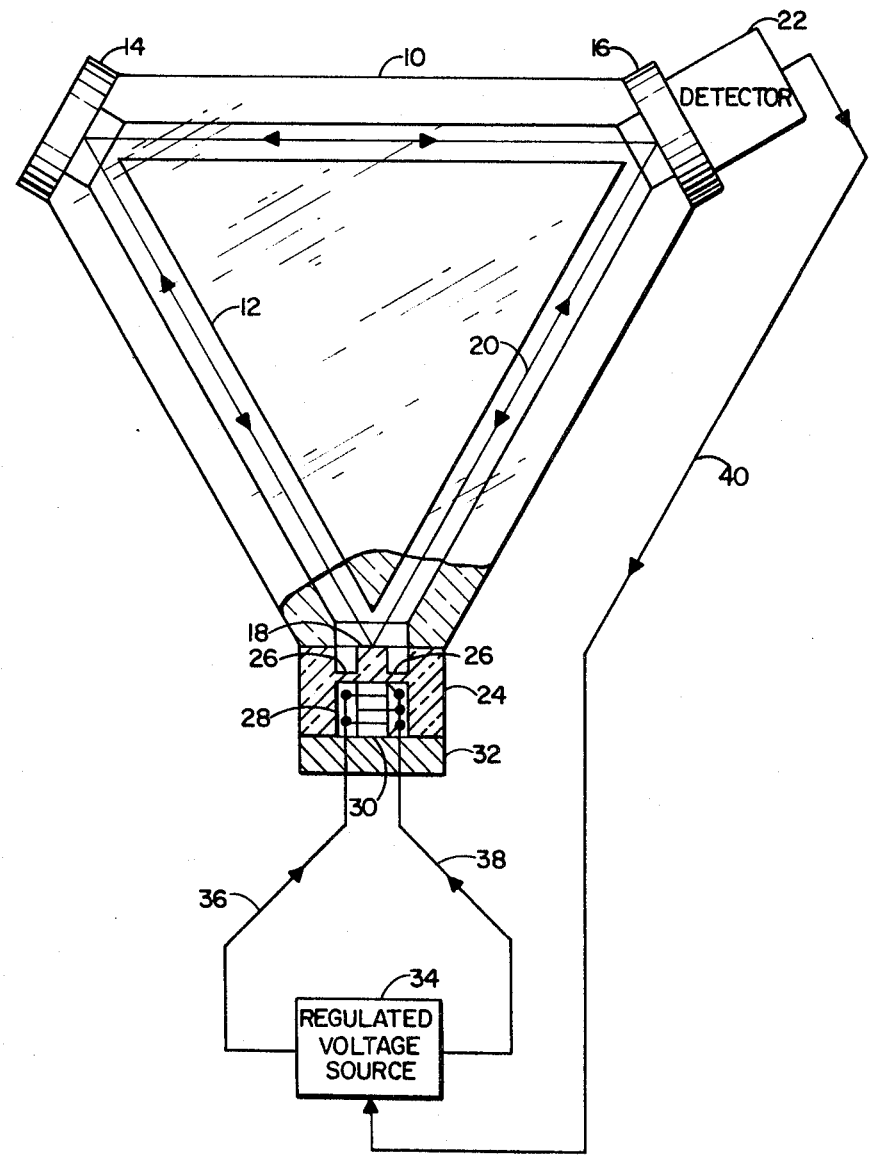
INVENTOR.
THEODORE J. PODGORSKI
BY Charles J. Ungemach
ATTORNEY

ADJUSTABLE, THIN MEMBRANE MIRROR FOR USE IN THE STABILIZATION OF RING LASERS

BACKGROUND OF THE INVENTION

This invention has utility in the laser field. Generally mirrors are used to support and reflect light beams in a laser device. Control of the laser beam is achieved by moving and adjusting the mirrors appropriately. To maintain the extreme dimensional stability and gas sealing necessary to sustain stable laser action, the device should be constructed from a thermally and mechanically stable block. It is not possible to pass mechanical linkage into the laser housing and maintain this stability and sealing. Consequently, it is often necessary to incorporate a mirror moving mechanism within the laser cavity and, therefore, in contact with the lasing gas. This is undesirable in that the mirror actuating mechanism or driving means may have undesirable outgassing characteristics which contaminate the lasing gas. In addition, the electrical circuits to the driving means may interfere with the electrical characteristics of the gas. The present invention operates to alleviate these problems.

SUMMARY OF THE INVENTION

My invention contemplates placing the driving means on the outside of the laser device and transmitting the mechanical motion therefrom into the laser device by means of a thin membrane constructed out of the same or similar mechanically and thermally stable materials as a portion of the laser housing. The mirror may be mounted inside the laser, as before, on the inside of the thin membrane, but now the driving mechanism is separate from the lasing gas and no contamination may take place. In particular, my invention contemplates the use of an extremely stable material such as quartz in the construction of the laser housing and the thin membrane. Since laser adjustments are very small and delicate it is possible to bend a thin quartz member enough to achieve the required adjustment. It is, therefore, an object of the present invention to provide an improved mirror moving means for a laser device. It is a further object of my invention to provide a mirror moving means separate from the lasing gas. Other objects and advantages will become apparent to those skilled in the art upon consideration of the following description and drawing.

BRIEF DESCRIPTION OF THE DRAWING

In the drawing a typical laser device constructed in a transparent quartz block is shown with the novel portion shown in section.

DESCRIPTION OF THE PREFERRED EMBODIMENT

In the drawing a solid block 10, which may be constructed from a stable, rigid material such as quartz is shown. A triangular tunnel 12 is machined into block 10. Three mirrors, 14, 16 and 18 are glued or otherwise affixed to the corners of block 10 so as to reflect a light beam 20 about the triangular path in both directions. Mirror 16 is semitransparent so that one of the two counterrotating beams may pass through to a detector 22, which senses the point of maximum intensity of the beam. A typical use for a laser such as this would be in sensing rotation of block 10 which would cause a frequency difference in the two oppositely traveling beams 20. Such a device is explained in detail in copending U.S. Pat. application Ser. No. 435,969 filed on Mar. 1, 1965 in the name of Theodore Podgorski and assigned to the present assignee.

My invention comprises the apparatus for mounting mirror 18 so that mirror 18 may be adjusted and, therefore, the beams 20 controlled by a driving means which is external to the tunnel 12 which contains a lasing gas. A solid block 24 which again may be quartz or any other suitable stable material is affixed to block 10. The center of block 24 is machined down over an annular region until only a thin membrane 26 remains. Mirror 18 is then mounted to membrane 26 by any suitable means which in the preferred embodiment shown in the drawing comprises some remaining quartz in the center of membrane 26. A lower chamber 28 is machined into block 24 so as to contain a piezoelectric stack 30. Piezoelectric stack 30 is secured in place by a closing member 32. A regulated voltage source 34 operates to change the length of the piezoelectric stack 30 by means of leads 36 and 38 in response to a signal from detector 22 carried by a lead 40. The change in length of piezoelectric stack 30 operates to move membrane 26 and, therefore, mirror 18 so as to control laser beams 20. However, membrane 26 completely isolates piezoelectric stack 30 from tunnel 12 where the lasing gas is contained.

It should be understood that various modifications may be made to the apparatus as disclosed herein without departing from the spirit and scope of the invention. For example, piezoelectric stack 30 may be replaced by any suitable driving means, mechanical, electrical or fluid which will operate to flex membrane 26 in the desired manner. Block 24 may take many configurations and be constructed of any material which is suitably stable so as to provide a firm base for mirror 18 and yet allow a minute fluctuation through a thin portion thereof. Consequently, I do not intend the present invention to be limited to the particular embodiment and apparatus shown in the drawing except as defined by the appended claims.

I claim:

1. In a laser, a gastight chamber of dimensionally stable material including internally light-reflecting wall portions positioned to define a closed path for laser light therewithin, at least one of said portions comprising a block of said material internally grooved to leave a thin integral gas impervious annular web surrounding the light-reflective surface, whereby external force applied normal to said portion at the center of said annular web results in movement of said reflective surface such as to change the length of said path while remaining ever parallel to itself; and adjustable means external to said chamber for acting on said one portion to cause said movement thereof.